Patented Nov. 18, 1969

3,479,372
DIMERIC PEROXIDE OF n-BUTYL LEVULINATE AND PROCESS OF MAKING THE SAME
Yun G. Chang and Philip S. Bailey, Austin, Tex., assignors to Reichhold Chemicals, Inc., White Plains, N.Y.
No Drawing. Filed Oct. 11, 1966, Ser. No. 585,744
Int. Cl. C07d *19/00;* C08f *1/60*
U.S. Cl. 260—340.6                           1 Claim

ABSTRACT OF THE DISCLOSURE

A method of making a dimeric peroxide of a keto ester which comprises reacting n-butyl levulinate with hydrogen peroxide in a mineral acid medium selected from a group consisting of hydrochloric and sulfuric acids at temperatures within the range of about −10° C. to +80° C., the hydrogen peroxide having a concentration between 25 and 95 percent by weight. The resulting product is 4,4-bis(butyl pentanoate) diperoxide, which has a high boiling point and is relatively stable at high temperatures. This novel compound has been found to be useful as a cross-linking agent and as a catalyst or initiator of polymerization reactions, such as the polymerization of styrene, vinyl acetate, methyl methacrylate, and the like.

---

This invention relates to a new chemical compound and more particularly to dimeric peroxides of keto esters, and to the process of making the same.

More specifically the object of this invention is to provide a new chemical compound, the dimeric peroxide of n-butyl levulinate having many useful properties.

The following example is given to illustrate certain facets of the invention and is not intended to limit the scope of the invention.

EXAMPLE

When the keto ester, n-butyl levulinate, was reacted with hydrogen peroxide in the presence of a mineral acid, such as sulfuric acid, a dimeric peroxide was formed and isolated as a colorless, heavy liquid. The acid-catalyzed reaction is shown as follows:

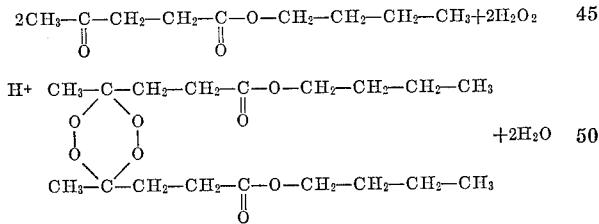

The above reaction was carried out as follows.

Thirty-four and four-tenths grams (0.20 mole) of n-butyl levulinate and 9.7 g. (0.20 mole) of 70% hydrogen peroxide solution were mixed together at 0–10° C. To the resulting mixture was slowly added 56.0 g. (0.40 mole) of 70% sulfuric acid at 0–10° C. with agitation. The reaction mixture was stirred at room temperature for four hours and then was allowed to stand at this temperature overnight. The oragnic layer was separated. The aqueous solution was extracted three times with 15-ml. portions of ether and the ether extract combined with the organic layer. The resulting solution was washed once with water, five times with saturated sodium bicarbonate solution and again once with water. Finally it was dried with anhydrous magnesium sulfate. Filtration and removal of low-boiling materials under reduced pressure left a colorless, heavy liquid product weighing 26.5 g. (70.50% yield based on the n-butyl levulinate used). This product had an active oxygen content of 8.30% (theoretically 8.51%), shown by the hydriodic acid-sodium thiosulfate titration, and the constants, $n_D^{25}$ 1.4559, $d_4^{25}$ 1.0880, MR (calcd.) 94.25, MR (obsd.) 94.04.

*Analysis.*—Calcd. for $C_{18}H_{32}O_8$: C, 57.43; H, 8.57; molecular weight, 376.45. Found: C, 57.51; H, 8.37; molecular weight, 348.

The infrared spectrum of this compound showed a strong, broad band at 1680–1740 cm.$^{-1}$ due to a carbonyl group and a band at 860 cm.$^{-1}$ due to a peroxide group. The thin-layer chromatogram of this compound, obtained by employing a silica gel film and an acetone-carbon tetrachloride mixture as a solvent, had only one spot shown by hydriodic acid and no spot shown by potassium iodide solution. On the basis of these data, this peroxide has the structural formula as shown on the right side of the preceding equation.

The dimeric peroxide of n-butyl levulinate, 4,4-bis (butyl pentanoate) diperoxide, is high boiling and is relatively stable at high temperatures.

Further, this new compound has been found to be exceedingly useful as a cross-linking agent and as a catalyst or initiator of polymerization reactions, such as the polymerization of styrene, vinyl acetate, methyl methacrylate, and the like.

In the production of this compound, the hydrogen peroxide may have a concentration of from about 25 percent to about 95 percent by weight. However, it was found that the concentration of the hydrogen peroxide is particularly suitable when it is between 70 percent and 85 percent by weight. Although sulfuric acid was utilized in the example, other mineral acids, such as hydrochloric acid, may also be used to form the acid medium. It is now believed that the mineral acids, i.e. sulfuric or hydrochloric acid, act as catalysts in this reaction.

The temperature of the formation of the subject peroxide during its production may vary from minus 10° C. to plus 80° C. However, temperatures between 10° C. and 30° C. have been found to give outstanding results.

We claim:
1. 4,4-bis(butyl pentanoate) diperoxide.

References Cited

UNITED STATES PATENTS 2,591,645    4/1952    Walter _____ 260—340.6

OTHER REFERENCES

Fichter et al.: Helv. Chim. Acta, vol. 14, 1931, pp. 1445–48.

ALEX MAZEL, Primary Examiner
JAMES H. TURNIPSEED, Assistant Examiner

U.S. Cl. X.R.
252—426; 260—89.3, 89.5, 93.5